US010582050B2

(12) United States Patent
Deole et al.

(10) Patent No.: US 10,582,050 B2
(45) Date of Patent: Mar. 3, 2020

(54) PERSONALIZED WAIT TREATMENT DURING INTERACTION WITH CONTACT CENTERS

(71) Applicant: Avaya Inc., Santa Clara, CA (US)

(72) Inventors: Pushkar Yashavant Deole, Pune (IN); Joel M. Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/938,283

(22) Filed: Mar. 28, 2018

(65) Prior Publication Data

US 2019/0306309 A1    Oct. 3, 2019

(51) Int. Cl.
*H04M 3/428* (2006.01)
*H04M 3/51* (2006.01)

(52) U.S. Cl.
CPC ....... *H04M 3/4285* (2013.01); *H04M 3/4286* (2013.01); *H04M 3/5166* (2013.01); *H04M 3/5191* (2013.01); *H04M 2201/42* (2013.01)

(58) Field of Classification Search
CPC ............. H04M 3/4285; H04M 3/4286; H04M 3/5166; H04M 3/5191; H04M 2201/42; H04M 3/428; H04M 3/4283
USPC ............ 379/265.09, 265.05, 265.01, 215.01, 379/211.01, 266.01
See application file for complete search history.

(56) References Cited

U.S. PATENT DOCUMENTS

| | | | |
|---|---|---|---|
| 6,735,193 B1 * | 5/2004 | Bauer | H04M 3/428 370/236 |
| 2005/0249192 A1 * | 11/2005 | Schoeneberger | H04L 29/06027 370/352 |
| 2007/0047711 A1 * | 3/2007 | Florkey | H04M 3/4285 379/162 |

OTHER PUBLICATIONS

Rosenberg et al. "SIP: Session Initiation Protocol," The Internet Society, Jun. 2002, RFC 3261, 252 pages.

* cited by examiner

*Primary Examiner* — Thjuan K Addy
(74) *Attorney, Agent, or Firm* — Sheridan Ross P.C.

(57) ABSTRACT

A communication session with a communication endpoint is established. The communication session is placed on hold. For example, the communication session is placed on hold by being sent to a contact center queue. In response to placing the communication session on hold, a first message is sent to the communication endpoint that indicates the communication session has been placed on hold. A second message is received from the communication endpoint that indicates that a user of the communication endpoint would like to play personal media while the communication session is on hold. The communication session is later taken off hold. In response to determining that the communication session is taken off hold, a third message is sent to the communication endpoint to stop playing the personalized media. This process allows the user to play personalized media while being placed on hold.

20 Claims, 5 Drawing Sheets

PERSONALIZED WAIT TREATMENT DURING INTERACTION WITH CONTACT CENTERS

FIELD

The disclosure relates generally to contact centers and particularly to managing how calls are placed on hold in a contact center.

BACKGROUND

Traditionally, customers would call into a contact center using telephone equipment. For example, a customer may call into the contact center using a landline telephone or mobile telephone. The customer would then be placed on hold while waiting to be serviced by the contact center. While on hold, the customer may hear music or a feed of a radio station that is provided by the contact center.

Today, customers have shifted towards more of a "Web" centric or application centric solution to connect to the contact center. With the advent of technology, such as, Web Real-Time Communication (WebRTC), the customers of today prefer to make audio/video calls through an application running inside a web browser or a downloaded application. In this new paradigm, the problem of a customer having to wait to be serviced by a contact center agent still exists. If the call volume is high, the customer has to listen to generic music played by a contact center Interactive Voice Response (IVR) system or similar. At times, this can be quite irritating for the customer since not only does the customer have to wait for an extended period, but the customer has no option other than to listen to the generic music played by the contact center IVR system.

SUMMARY

These and other needs are addressed by the various embodiments and configurations of the present disclosure. A communication session with a communication endpoint is established. The communication session is placed on hold. For example, the communication session is placed on hold by being sent to a contact center queue. In response to placing the communication session on hold, a first message is sent to the communication endpoint that indicates the communication session has been placed on hold. A second message is received from the communication endpoint that indicates that a user of the communication endpoint would like to play personal media while the communication session is on hold. The communication session is later taken off hold. In response to determining that the communication session is taken off hold, a third message is sent to the communication endpoint to stop playing the personalized media. This process allows the user to play personalized media while being placed on hold.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
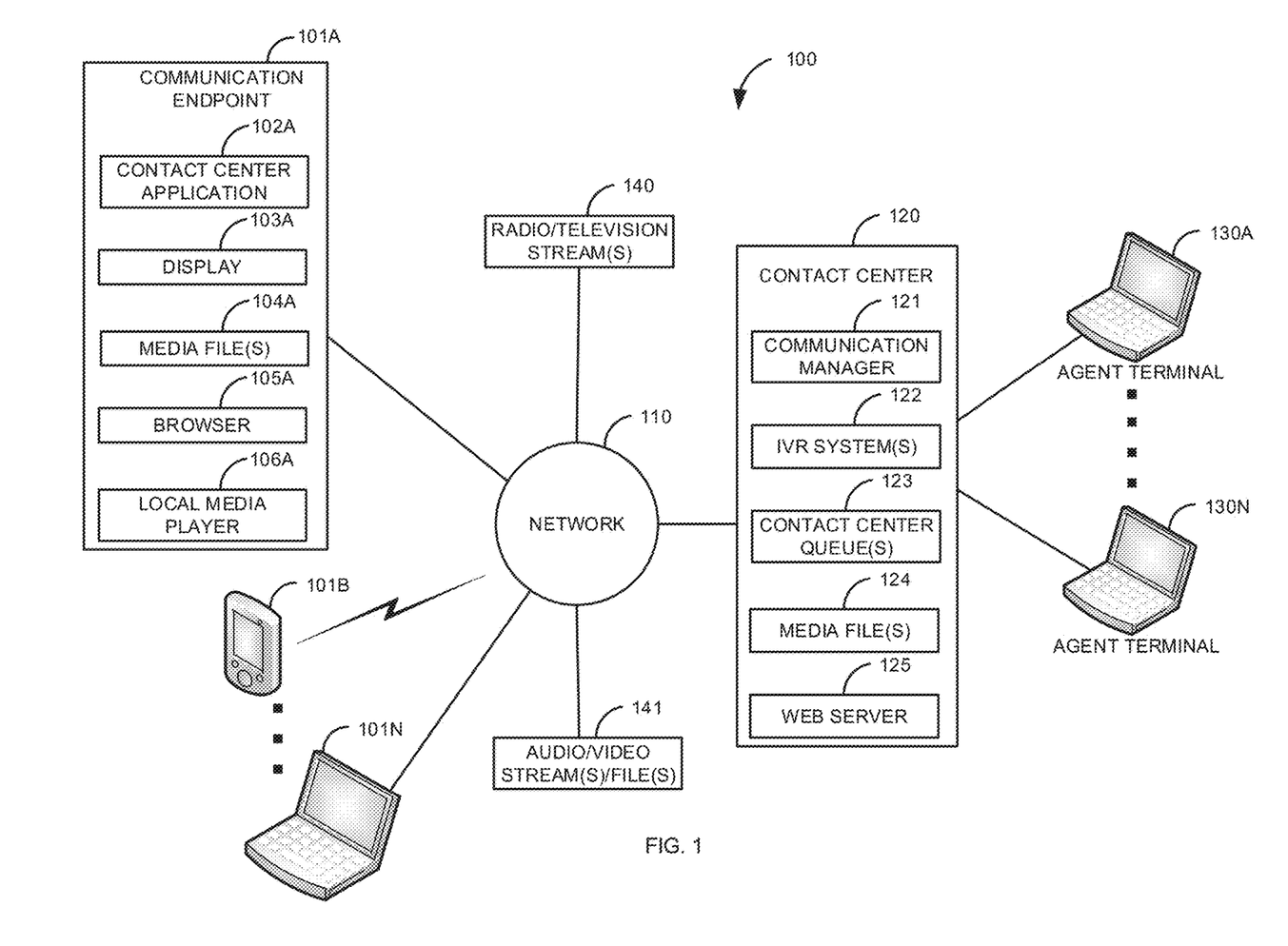
FIG. 1 is a block diagram of a first illustrative system for playing personal media while on a user is placed on hold by a contact center.

FIG. 1 is a block diagram of a first illustrative system 100 for playing personal media while a user is placed on hold by a contact center 120. The first illustrative system 100 comprises communication endpoints 101A-101N, a network 110, a contact center 120, agent terminals 130A-130N, radio/television stream(s) 140, and audio/video stream(s)/file(s) 141.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a laptop, a smartphone, and/or the like. The communication endpoints 101A-101N are user devices where a communication sessions ends. The communication endpoints 101A-101N are not network elements that facilitate and/or relay a communication session in the network, such as a communication manager or router. As shown in FIG. 1, any number of communication endpoints 101A-101N may be connected to the network 110.

The communication endpoint 101A further comprises a contact center application 102A, a display 103A, media file(s) 104A, a browser 105A, and a local media player 106A. The contact center application 102A can be or may include any software application that can be loaded on the communication endpoint 101A that can provide services for the contact center 120. For example, the contact center application 102A may provide a user interface that allows a user to initiate a voice call, initiate a video call, send an email, send a text message, initiate a virtual reality session, initiate an IM session, and/or the like to the contact center. The contact center application 102A may be used for digital self-service in addition to assisted service via a contact center. For example, the contact center application 102A may be a self-service banking application that includes the ability to place voice/video calls via WebRTC to a contact center 120.

The display 103A can be or may include any hardware display that can present information to the user, such as a touch screen, a Light Emitting Diode (LED) display, a plasma display, a Cathode Ray Tube (CRT), a liquid crystal display, and/or the like.

The media files 104A are any media files 104A that are stored locally on the communication endpoint 101A. The media files 104A may be music files, video files, audio files, movies, and/or the like.

The browser 105A can be or may be any known browser, such as Google Chrome®, Mozilla Firefox®, Internet Explorer®, Safari®, Opera®, and/or the like. The browser 105A can communicate with the contact center 120 by uploading a webpage provided by the web server 125.

The local media player 106 can be any media player that is installed on the communication endpoint 101A, such as iTunes®, Windows Media Player®, VLC media player, Kodi, GOM Player, and/or the like. The local media player 106 may be a media player that is embedded into the browser 105 that uses JavaScript to play the media file(s) 104, radio/television stream(s) 140, audio/video stream(s)/file(s) 141, and/or the like.

In one embodiment, the communication endpoint 101A may comprise a subset of the elements 102A-106A. For example, the communication endpoint 101A may not have the contact center application 102A. In this embodiment, the communication endpoint 101A may access the contact center 120 via the browser 105A/web server 125. For instance, the user, via the browser 105 (e.g., as discussed later in FIG. 3), may select a media file 104 that is played by a local media player 106 embedded in the browser 105. Alternatively, the communication endpoint 101A may communicate with the contact center 120 via the contact center application 102A instead of via the browser 105A/web server 125.

Although not shown for simplicity, the communication endpoints 101B-101N may also comprise one or more of the elements 102-106. For example, the communication endpoint 101B may comprise elements 102B-106B and the communication endpoint 101N may comprise elements 102N-106N.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Web Real-Time Communication (WebRTC) protocol, H.323, video protocols, Hyper Text Transport Protocol (HTTP), Integrated Services Digital Network (ISDN), and/or the like. Thus, the network 110 is an electronic communication network configured to carry messages via packets and/or circuit switched communications.

The contact center 120 can be or may include any hardware coupled with software that can route and manage communications in the contact center 120, such as a Private Branch Exchange (PBX), a communication manager 121, a session manager, a call center, and/or the like. The contact center 120 further comprises the communication manager 121, IVR system(s) 122, contact center queue(s) 123, media file(s) 124, and a web server 125.

The communication manager 121 can be or may include any hardware coupled with software that can route and manage communications in the contact center 120, such as a PBX, a session manager, a switch, a router, and/or the like. The communication manager 121 can manage various types of communications in the contact center 120, such as voice communications, video communications, emails, Instant Messaging (IM) communications, text messaging, virtual reality communications, and/or the like.

The IVR system(s) 122 can be or may include any hardware coupled with software that can provide an automated voice interaction with a caller. The IVR system(s) 122 typically provides a series of menus that can be used by the caller to get service from the contact center 120. The IVR system(s) 122 may provide other features, such as music-on-hold when the caller is placed on hold in one of the contact center queues 123. In one embodiment, the IVR system 122 may be a video/virtual reality IVR system 122 that provides one or more visual avatars that provides navigation by asking the caller questions. For example, an avatar provided by the IVR system 122 may ask the caller for a specific product that the caller is calling about.

The contact center queue(s) 123 are designed to hold incoming calls while the caller is waiting to be connected to a contact center agent (e.g., a contact center agent at agent terminal 130A). The contact center queue(s) 123 may hold any number of incoming calls. The contact center queue(s) 123 may have various wait times for a call that is on hold based on a current call volume in the contact center 120. The contact center queue(s) 123 may support one or more types of communications, such as, voice calls, video calls, emails, Instant Message sessions, text messages, virtual reality communications, and/or the like. As discussed herein and in the claims, the use of the term "on hold" or "hold" also includes where a communication (e.g., a voice or video call) is placed into a contact center queue 123.

The media files 124 can be or may include any media files that can be streamed from the contact center 120 while a user is in hold, such as music files, audio files, advertisements, announcements, video files, movies, radio streams, television streams, and/or the like. The media files are non-personalized media files that are streamed to contact center callers.

The web server 125 can be or may include any web server that can provide one or more web pages to the browser 105, such as Apache®, Nginx®, Internet Information Server®, LiteSpeed Web Server®, and/or the like. The web server 125 may provide multiple webpages. In one embodiment, the web server 125 may provide a variety of webpages, such as help webpages, contact webpages, product webpages, and/or the like.

The agent terminals 130A-130N can be or may include any communication device that is used by a contact center agent, such as, the communication endpoint 101. The agent terminals 130A-130N may comprise multiple agent terminals 130A-130N for each contact center agent. For example, a contact center agent may have a telephone and a personal computer.

The radio/television stream(s) 140 can be or may include any types of media streams that are streamed as part of a radio/television programming. The radio/television stream(s) 140 can be reached in various ways, such as based on a Uniform Resource Locator (URL), based on a network address, and/or the like.

The audio/video stream(s)/file(s) 141 can be or may include any files/media streams that can be accessed by the communication endpoint 101 via the network 110. The audio/video stream(s)/file(s) 141 may include media files that are accessible via web sites.

Figure 2:
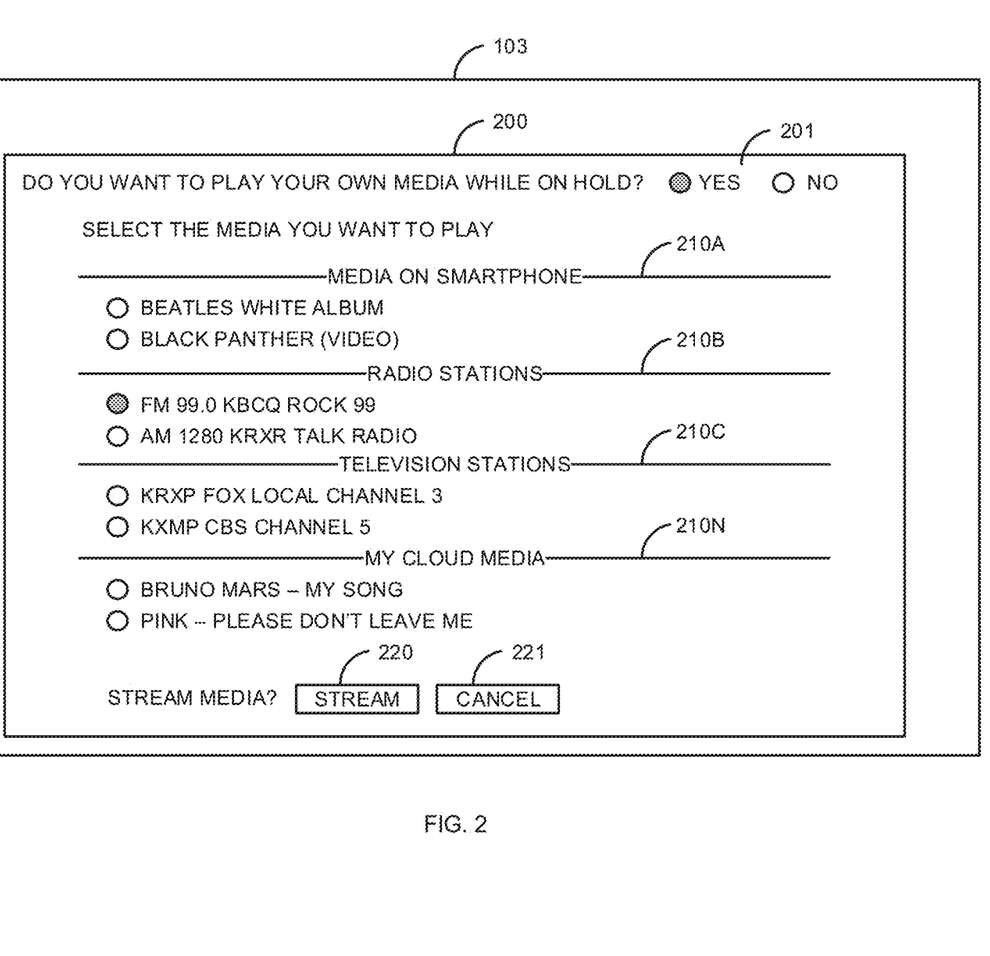
FIG. 2 is a diagram of a user interface for selecting personal media while a user is placed on hold by a contact center.

FIG. 2 is a diagram of a user interface 200 for selecting personal media while the user is placed on hold by the contact center 120. FIG. 2 is an exemplary diagram of a user interface that is provided by the contact center application 102. The user interface 200 comprises media selection radio button 201, listed local media 210A, listed radio stations 210B, listed television stations 210C, listed cloud media 210N, stream media button 220, and cancel button 221.

The listed local media 210A, in this example, shows two selections for local media: 1) the Beatles White Album, and 2) the Black Panther movie. The listed radio stations 210B comprises: 1) FM 99.0 KBCQ Rock 99 and 2) AM 1280 KRXR Talk Radio. The listed television stations 210C comprises: 1) KRXP Fox Local Channel 3 and 2) KXMP CBS Channel 5. The listed cloud media 210N comprises: 1) Bruno Mars—My Song, and 2) Pink—Please Don't Leave Me.

The user interface 200 is displayed in the display 103, by the contact center application 102A, when a user is placed on hold by the contact center 120. For example, the user may bring up the contact center application 102A on the communication endpoint 101A. The user may then select a button to initiate a voice call to the contact center 120. The voice call may be established using various protocols, such as SIP, H.323, video protocols, and/or the like. At some point the user is placed on hold by the contact center 120 and the contact center application 102 then displays the user interface 200.

If the user wants to play their own personalized media while on hold, the user selects the media selection radio button 201 (YES as displayed). The selection of "YES" on the media selection radio button 201 causes the different media selection options 210A-210N to be displayed along with the stream media button 220 and the cancel button 221. The user then selects one or more media options that the user wants to play, which then enables the stream media button 220. Depending upon the selected option, other media options may or may not be selectable. For example, as shown in FIG. 2, selection of a live media stream (e.g., FM 99.0 FBCQ Rock 99) may cause all the other selections to be disabled (not selectable). If the option is to play a media file 104 (or group of media files 104) the user may be able to select additional media files 104 to be played. For example, (although not shown) the user may be able to select the Beatles White Album and an additional media file 104 to play. The order that the media files 104 are played in may be based on the same order of selection by the user.

The user then selects the stream media button 220, which begins the play of the selected media source(s). For example, as shown in FIG. 2, if the user selected the stream media button 220, the FM 99.0 KBCQ Rock 99 radio stream would be played to the user while the user is waiting on hold. If the user does not want to play personalized media, the user selects the cancel button 221.

Figure 3:
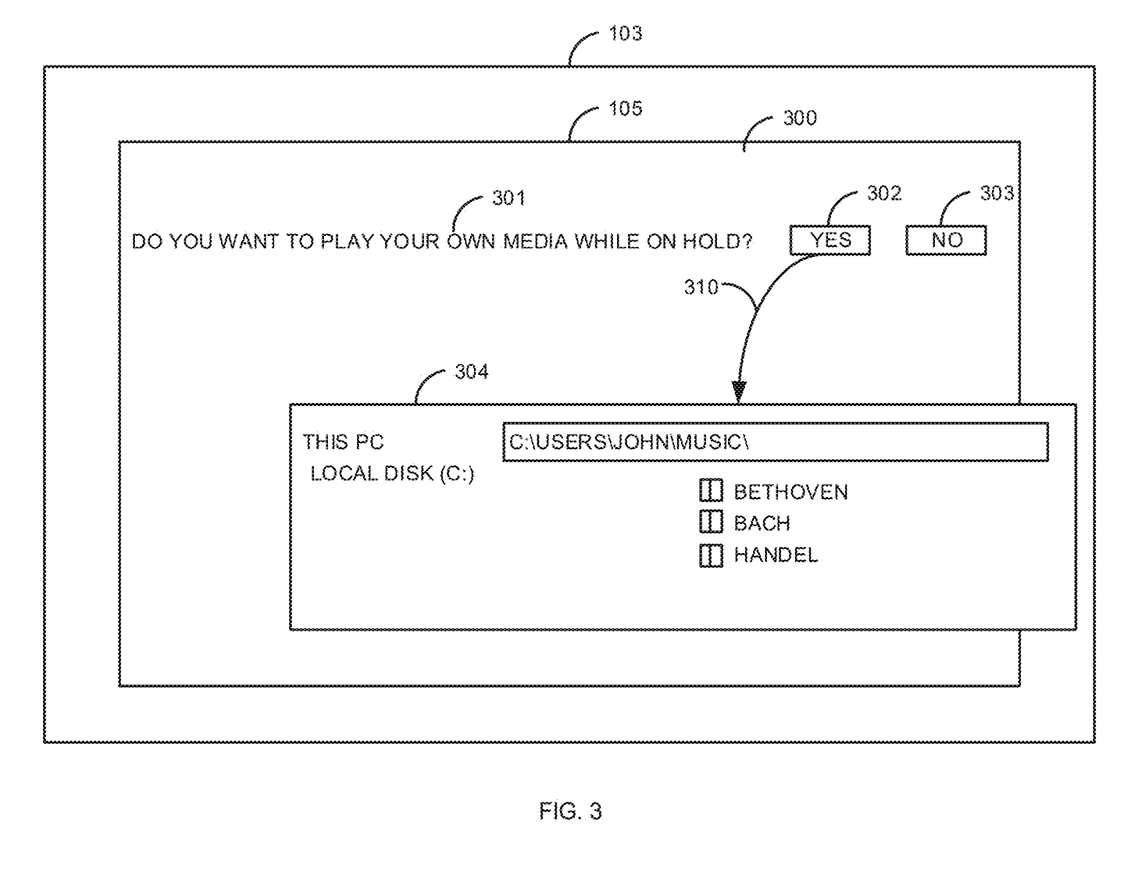
FIG. 3 is a diagram of a web page displayed in a view of a browser that is used for selecting personal media while being placed on hold by a contact center.

FIG. 3 is a diagram of a web page displayed in a view of a browser 300 that is used for selecting personal media while being placed on hold by a contact center 120. FIG. 3 shows an exemplary display 103 of a communication endpoint 101 where the browser 105 is displayed. The display 103 shows an exemplary view of the browser 300. The view of the browser 300 displays an option to play media while on hold 301, a yes button 302, and no button 303. FIG. 3 also shows a browse window 304.

The view of the browser 300 is displayed to a user based on the user navigating with the browser 105 to the web server 125 of the contact center 120. After the user has initiated a call (i.e., voice, video, or virtual reality), the view of the browser 300 is displayed to the user when the user is placed on hold by the contact center 120. The communication session between the browser 105 and the web server 125 may use various protocols, such as Hyper Text Markup Language (HTML), WebRTC, video protocols, and/or the like. For example, the user may enter a URL for the web server 125, which gives the user an option (not shown) to make a video call, via WebRTC with the contact center 120. After the user selects the option to make the video call, when the user is placed on hold by the contact center 120, the view of the browser 300 (without the browse window 304) is displayed to the user.

If the user does not want to play personalized media while placed on hold by the contact center 120, the user can select the no button 303. Otherwise, if the user wants to play personalized media while on hold, the user can select the yes button 302. This results in the browse window 304 being displayed to the user in step 310. By using the browse window 304, the user can select a media file 104 (e.g., a music or video file) to play while on hold. After the user selects the media file from the browse window 304, a media player in is executed in the web page and plays the selected media file.

In an alternative embodiment, instead of displaying the browse window 304 in step 310, when the user selects the yes button 302, a local media player 106 could be invoked by the browser 105 based on a protocol URL. A protocol URL is where an application (i.e., local media player 106) has registered with the operating system so that the application can be invoked from the browser 105. For example, Microsoft Windows® allows an application to modify the Windows Registry with the protocol URL (e.g., see http://msdn.microsoft.com/en-us/library/aa767914(VS.85).aspx). When a web page is loaded in the browser 105, the web page invokes the protocol URL and the local media player 106 (e.g., iTunes®) is executed. This allows the user to select the local media player 106 to play media while being placed on hold by the contact center 120. When the user is taken off hold, a similar process is used by the loaded webpage to un-invoke the local media player 106 to stop playing the user's personal media.

The user interface 200 and the view of the browser 300 are exemplary embodiments of where a user is placed on hold in a voice and/or video communication session. If the user is in a voice only communication session, the user may only be able to select audio files to stream. If the user is placed on hold in a video session, the user may see and select both audio and/or video files to stream. Alternatively, the user may be in a voice only communication session and can play a video file while in the voice only communication session.

In addition, the process of placing a user on hold may also work for a virtual reality call. For example, when the user is placed on hold in a virtual reality call, a virtual reality character may walk up to the user's virtual reality character and ask the user's virtual reality character if the user wants to play their personalized media while they are placed on hold by the contact center 120. The user's yes response could either bring up user interface 200 or browse window 304. Alternatively, a billboard may be displayed in the virtual reality environment to the user's virtual reality character where the user can touch the billboard (similar to user interface 200) to select personalized media to play.

In addition, when the user is placed on hold (assuming that the user streams an audio file), the user is placed in a virtual line with other users who are waiting to see a contact center agent who is in a virtual room. As the other users ahead of the user (i.e., users higher in the contact center queue 123) get serviced by the contact center agent (e.g., they walk into the room), the user moves up in the line. When the user is transferred to the contact center agent, the user walks into the room and discusses the issue virtually with the contact center agent in the virtual room. At this point, the user's personal media is stopped.

Figure 4:
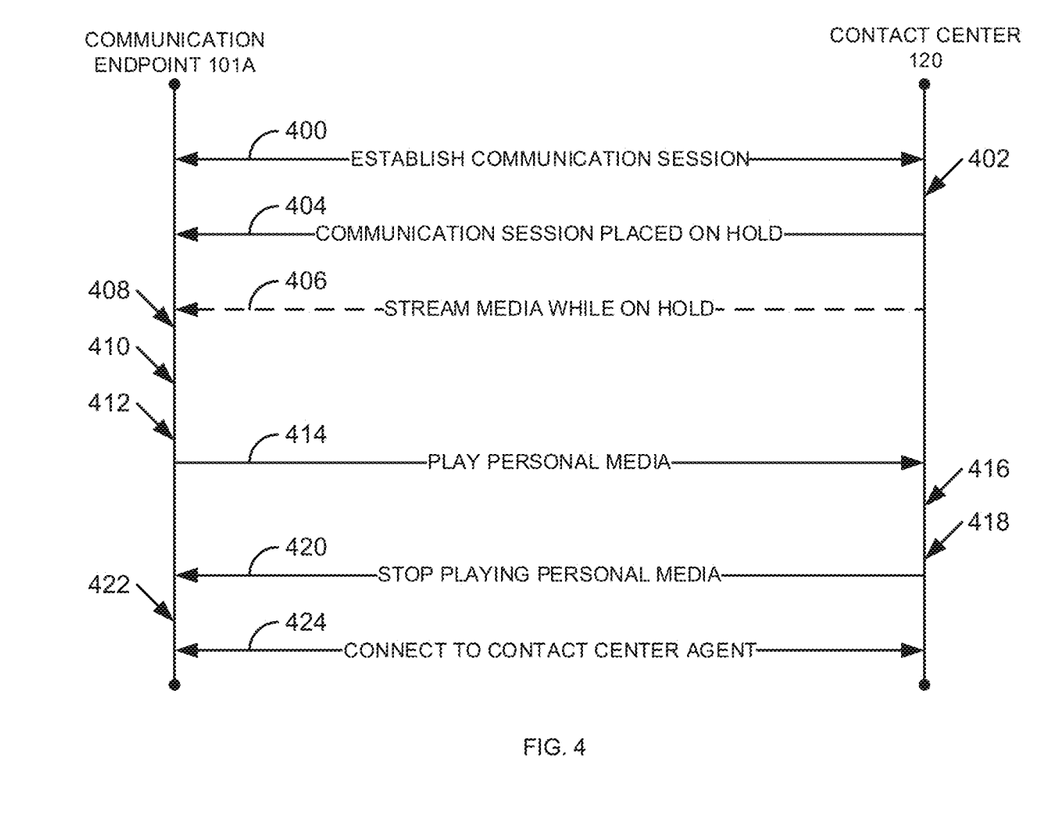
FIG. 4 is a flow diagram of a process for playing personal media while being placed on hold by a contact center.
Figure 5:
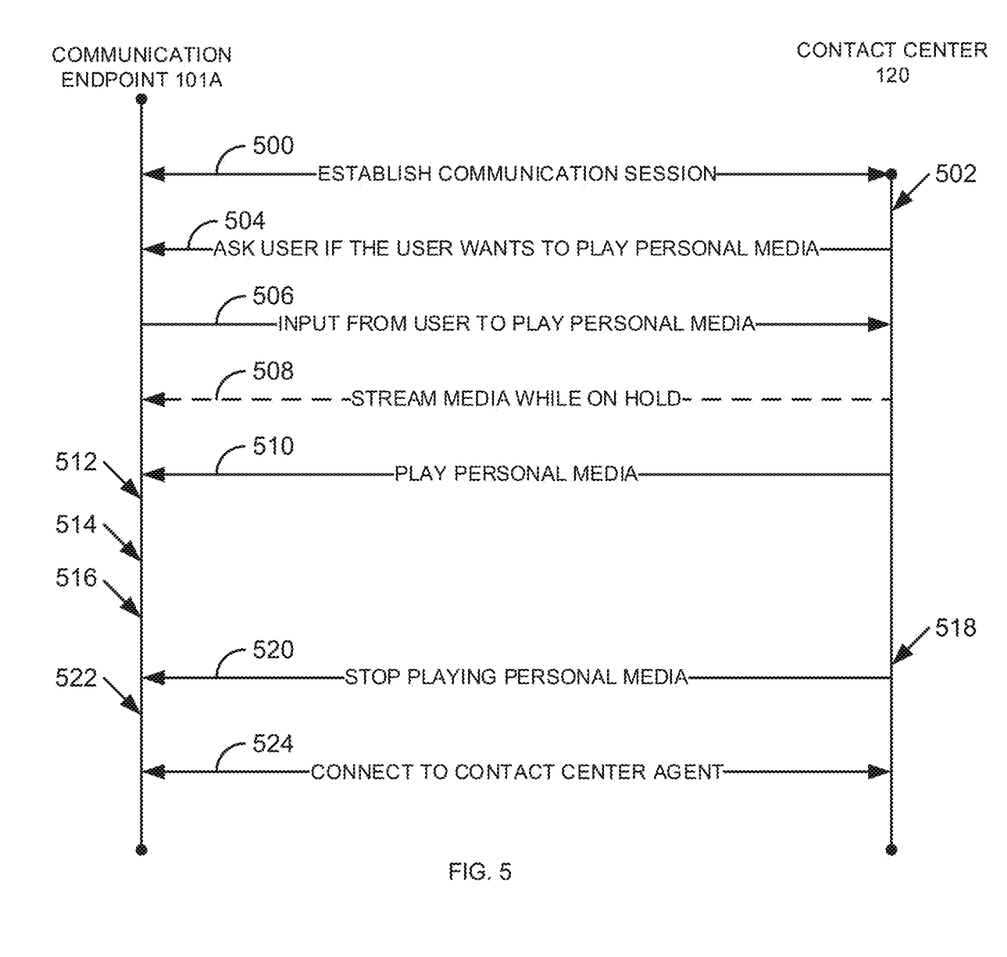
FIG. 5 is a flow diagram of a process for playing personal media while being placed on hold by a contact center.

FIG. 4 is a flow diagram of a process for playing personal media while being placed on hold by the contact center 120. Illustratively, the communication endpoints 101A-101N, the contact center application 102A, the display 103A, the media file(s) 104A, the browser 105A, the local media player 106, the network 110, the contact center 120, the communication manager 121, the IVR system(s) 122, the contact center queue(s) 123, the media files(s) 124, the web server 125, the agent terminals 130A-130N, the radio/television stream(s) 140, and the audio/video stream(s)/file(s) 141 used by stored-program-controlled entities, such as a computer or microprocessor, which performs the method of FIGS. 4-5 and the processes described herein by executing program instructions stored in a computer readable storage medium, such as a memory (i.e., a computer memory, a hard disk, and/or the like). Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in step 400 where a communication session is established between the communication endpoint 101A and the contact center 120. The communication session between the communication endpoint 101A and the contact center 120 may be established via the contact center application 102A or via a webpage loaded in the browser 105 from the web server 125. The user is then placed on hold in step 402. For example, the user of the communication endpoint 101A may initiate a voice call to the contact center 120 (via the contact center application 102A or the browser 105A) and is initially connected with the IVR system 122. Via the IVR system 122, the user is placed on hold (e.g., by being placed into the contact center queue 123). In response to the user being placed on hold, the contact center 120 sends a message, in step 404, to the communication endpoint 101A (i.e., to the contact center application 102A or the webpage loaded in the browser 105) that indicates that the communication session has been placed on hold by the contact center 120.

As shown in FIG. 4, the message of step 404 is a message that is sent outside of a media stream (e.g., not a message where the IVR system 122 tells the user that he/she has been placed on hold). Moreover, in one embodiment, the message of step 404 is not a communication session control channel message (e.g., SIP or H.323) that actually causes the communication endpoint 101A to be placed on hold; instead, the message of step 404 simply notifies the communication endpoint 101A that the contact center placed the user on hold.

The contact center 120 may optionally start to stream media while the user is placed on hold in step 406. For example, the contact center 120 may stream the media file 124 (i.e., music-on-hold) to the communication endpoint 101A in the voice communication session. In response to receiving the message of step 404 that the communication session has been placed on hold, the contact center application 102A or the browser 105 displays an option for the user to play personalized media in step 408. For example, the user interface 200 or the view of the browser 300 is displayed to the user of the communication endpoint 101A in step 408. In order for the user interface 200 to be displayed, the contact center application 102A and/or the downloaded web page may search the communication endpoint 101A (if possible by the downloaded web page), the radio/television stream(s) 140, and/or the audio/video stream(s)/file(s) 141 for media files/media streams to display. This may be done based on an Application Programming Interface (API) call that checks for local media and media that is identified by a URL (network based media files/streams). The search may occur in response to the user indicating that the user wants to stream personal media (step 410) or prior to the user indicating that the user want to stream personal media.

The user indicates, in step 410, that the user wants to play personalized media. For example, the user can indicate that the user wants to play personalized media by selecting the stream media button 220, by browsing to a media file in the browse window 304, or by selecting a media file from the local media player 106A when invoked by a protocol URL. The personal media is then played, in step 412, to the user of the communication endpoint 101A.

In addition, when the user indicates that the user wants to play personalized media in step 410, the contact center application 102A or the webpage loaded in the browser 105 sends, in step 414, a message that the user of the communication endpoint 101A would like to play personalized media while the communication session is placed on hold by the contact center 120. In response to receiving the message of step 414, the contact center 120 stops streaming, in step 416, the media stream of step 406 (if the media stream is being sent).

In one embodiment, the message of step 414 is not sent to the contact center 120. In this case, the contact center application 102A or the web page loaded in the browser 105 ignores the media stream that is sent in step 406.

At a later point in time, the contact center 120 determines, in step 418, that the user has been taken off hold. For example, the voice communication session may have been transferred from the contact center queue 123 to the agent terminal 130A (e.g., a telephone of a contact center agent). When the user has been taken off hold by the contact center 120 in step 418, the contact center 120 sends, in step 420, a message to the communication endpoint 101A to stop playing the personal media stream. In response to receiving the message of step 420, the communication endpoint 101A (i.e. the contact center application 102A/loaded webpage/local media player 106A) stops playing the personal media stream in step 422. The user is then connected to a contact center agent in step 424. In one embodiment, instead of connecting to a contact center agent in step 424, the user may be taken off hold and connected to an automated agent. For example, the user may be connected back to IVR system 122 to navigate one or more IVR menus.

FIG. 5 is a flow diagram of a process for playing personal media while being placed on hold by the contact center 120. The process starts in step 500 where a communication session is established between the communication endpoint 101A and the contact center 120. The communication session between the communication endpoint 101A and the contact center 120 may be established via the contact center application 102A or via a webpage loaded in the browser 105 from the web server 125. The user is then placed on hold in step 502. In response to the user being placed on hold (e.g., being placed into the contact center queue 123), the IVR system 122 asks the user if the user would like to play personal media in step 504. For example, the IVR system 122 may ask the user to select "1" if the user wants to play personal media or to select "2" if the user does not want to play personal media. If the user elects to not play personal media in step 506 (e.g. by selecting "2"), a media stream (e.g., music-on-hold from streaming media file 124) is sent by contact center 120, in step 506, to the communication endpoint 101A; the then process goes to step 522 where the user is connected to the contact center agent. When the user is connected to the contact center agent in step 522, the media stream being sent by the contact center 120 (step 508) ends.

If the user provides input to play personal media in step 506 (e.g., for example, the user selects "1" on the keypad of the communication endpoint 101A), the contact center 120 sends, in step 510, a message to the communication endpoint 101A (the contact center application 102A/web page loaded in the browser 105) that the user has selected to play personal media. In response to receiving the message of step 510, the contact center application 102A or the browser 105 displays an option for the user to play personalized media in step 512. For example, the user interface 200 or the view of the browser 300 is displayed to the user of the communication endpoint 101A in step 512.

In order for the user interface 200 to be displayed in step 512, the contact center application 102A or loaded web page may search the communication endpoint 101A (if possible by the loaded web page), the radio/television stream(s) 140, and/or the audio/video stream(s)/file(s) 141 for media files/media streams to display. This may be done based on an Application Programming Interface (API) call that checks for local media and media that is identified by a URL (network based media files/streams). The search may occur in response to the user indicating that the user wants to stream personal media (step 514) or prior to the user indicating that the user want to stream personal media.

The user indicates, in step 514, that the user wants to play personalized media. For example, the user can indicate that the user wants to play personalized media by selecting the stream media button 220, by browsing to a media file in the browse window 304, or by selecting a media file from local media player 106A when invoked by a protocol URL. In response to the user indicating that the user wants to play personalized media in step 514, the personal media is played to the user in step 516.

At a later point in time, the contact center 120 determines, in step 518, that the user has been taken off hold. For example, the voice communication session may have been transferred from the contact center queue 123 to the agent terminal 130A (e.g., a telephone of a contact center agent). When the user has been taken of hold by the contact center 120, the contact center 120 sends, in step 520, a message to the contact center application 102A or the loaded webpage to stop playing the personal media stream. In response to receiving the message of step 520, the communication endpoint 101A (i.e. the contact center application 102A/ loaded webpage/local media player 106A) stops playing the personal media stream in step 522. The user is then connected to a contact center agent in step 524. In one embodiment, instead of connecting to a contact center agent in step 524, the user may be taken off hold and connected to an automated agent. For example, the user may be connected back to IVR system 122 to navigate IVR menus.

FIGS. 1-5, discuss embodiments where a contact center application 102 is used or where the web server 125 provides a web page that is displayed via the browser 105. In one embodiment, the contact center application 102/web page that is displayed via the browser 105 may include WebRTC capabilities. For example, the WebRTC application may be a self-service banking application. The self-service banking application has two primary modes of operation: 1) a self-service function (non-real-time), and 2) a call placement function (real-time). The self-service function allows the user access non-real time digital services, such as, to check bank balances, make deposits, and/or the like. The self-service function uses a separate communication path with the contact center 120.

The call placement function allows the user to make a real-time call to the contact center 120 to talk to a contact center agent. The call placement function can work in different ways. For example, the contact center 120 can tell a server-side web/mobile infrastructure (not shown) that a call has been placed on hold and answered (taken off hold). The server-side web/mobile infrastructure would then relay this state information to the browser 105/contact center application 102. Alternatively, the contact center 120 can notify a WebRTC library/client (in the contact center application 102 or browser 105) that a call has been queued/held and answered/un-held. The WebRTC library/client would then notify the digital self-service part of the browser 105/contact center application 102.

Although the processes described herein are described where a contact center 120 places a user on hold, the process will also work for any system that places a user on hold. For example, instead of a contact center placing user on hold, a PBX or other communication endpoint 101 may send the same messages as the contact center 120.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
establish a communication session with a communication endpoint, wherein the communication endpoint comprises a web browser in communication with a contact center, by uploading a web page provided by a web server;
place the communication endpoint on hold;
in response to placing the communication endpoint on hold, send a first message via the web server to the communication endpoint that indicates that that the communication endpoint has been placed on hold;
determine that the communication endpoint has been taken off hold; and
in response to determining that the communication endpoint has been taken off hold, send a second message via the web server to the communication endpoint to stop playing a personalized media.

2. The system of claim 1, further comprising microprocessor readable and executable instructions that program the microprocessor to:
receive, from the communication endpoint, a third message via the web server that indicates that a user of the communication endpoint would like to play the personal media while the communication endpoint is on hold.

3. The system of claim 2, further comprising microprocessor readable and executable instructions that program the microprocessor to:

send non-personalized media to the communication endpoint in response to placing the communication endpoint on hold; and
stop sending the non-personalized media to the communication endpoint in response to receiving the third message via the web server.

4. The system of claim 1, wherein the first message is sent via the web server and separate from any media streams.

5. The system of claim 1, wherein the first message is specifically directed toward a contact center application installed on the communication endpoint, wherein in response to receiving the first message, the contact center application displays a graphical user interface to allow a user to select at least one of a media file or media stream to play while the communication endpoint is on hold.

6. The system of claim 1, wherein the first message causes the communication endpoint to search the communication endpoint for media files that reside on the communication endpoint.

7. The system of claim 1, wherein the communication session is a virtual reality communication session that has been placed on hold, wherein in response to placing the communication endpoint on hold, a user of the communication endpoint is asked by a displayed virtual reality character in a displayed virtual reality environment if the user wants to play the personalized media.

8. The system of claim 1, wherein the first message that indicates that the communication endpoint has been placed on hold is sent based on the communication session being placed into a contact center queue.

9. A method comprising:
establishing, by a microprocessor, a communication session with a communication endpoint;
placing, by the microprocessor, the communication endpoint on hold, wherein the communication endpoint comprises a web browser in communication with a contact center by uploading a web page provided by a web server;
in response to placing the communication endpoint on hold, sending via the web server, by the microprocessor, a first message to the communication endpoint that indicates that the communication endpoint has been placed on hold;
determining, by the microprocessor, that the communication endpoint has been taken off hold; and
in response to determining that the communication endpoint has been taken off hold, sending via the web server, by the microprocessor, a second message to the communication endpoint to stop playing a personalized media.

10. The method of claim 9, further comprising:
receiving via the web server, by the microprocessor and from the communication endpoint, a third message that indicates that a user of the communication endpoint would like to play the personal media while the communication endpoint is on hold.

11. The method of claim 10, further comprising:
sending, by the microprocessor, non-personalized media to the communication endpoint in response to placing the communication endpoint on hold; and
stop sending, by the microprocessor, the non-personalized media to the communication endpoint in response to receiving the third message.

12. The method of claim 9, wherein the first message is sent separate from any media streams.

13. The method of claim 9, wherein the first message is specifically directed toward a contact center application installed on the communication endpoint, wherein in response to receiving the first message, the contact center application displays a graphical user interface to allow a user to select at least one of a media file or media stream to play while the communication endpoint is on hold.

14. The method of claim 9, wherein the communication session is a virtual reality communication session that has been placed on hold, wherein in response to placing the communication endpoint on hold, a user of the communication endpoint is asked by a displayed virtual reality character in a displayed virtual reality environment if the user wants to play the personalized media.

15. The method of claim 9, wherein the first message causes the communication endpoint to search a network for one or more media streams that can be streamed directly to the communication endpoint while the communication endpoint is on hold.

16. The method of claim 9, wherein the first message that indicates that the communication endpoint has been placed on hold is sent based on the communication session being placed into a contact center queue.

17. A system comprising:
a microprocessor; and
a computer readable medium, coupled with the microprocessor and comprising microprocessor readable and executable instructions that program the microprocessor to:
establish a communication session with a communication endpoint, wherein the communication endpoint comprises a web browser in communication with a contact center by uploading a web page provided by a web server;
place the communication endpoint on hold;
in response to placing the communication endpoint on hold, play, by an Interactive Voice Response (IVR) system, a first message, via the web server, asking if a user of the communication endpoint wants to play a personal media while the communication endpoint is on hold;
receive, by the IVR system, input from the user at the communication endpoint that the user wants to play the personal media;
send a second message via the web server to the communication endpoint that the user has selected to play the personal media;
determine that the communication endpoint is being taken off hold; and
in response to determining that the communication endpoint is being taken off hold, sending a third message via the web server to the communication endpoint to stop playing the personalized media.

18. The system of claim 17, further comprising microprocessor readable and executable instructions that program the microprocessor to:
send non-personalized media to the communication endpoint in response to placing the communication endpoint on hold; and
stop sending the non-personalized media to the communication endpoint in response to receiving input from the user that the user wants to play the personal media.

19. The system of claim 17, wherein the second message is specifically directed via the web server toward a contact center application installed on the communication endpoint, wherein in response to receiving the first message, the contact center application displays a graphical user interface to allow the user to select a media file to play while the communication endpoint is on hold.

20. The system of claim 17, wherein the second message causes the communication endpoint to search a network for one or more media streams that can be streamed directly to the communication endpoint while the communication endpoint is on hold.

* * * * *

UNITED STATES PATENT AND TRADEMARK OFFICE
CERTIFICATE OF CORRECTION

| | |
|---|---|
| PATENT NO. | : 10,582,050 B2 |
| APPLICATION NO. | : 15/938283 |
| DATED | : March 3, 2020 |
| INVENTOR(S) | : Pushkar Yashavant Deole and Joel M. Ezell |

Page 1 of 1

It is certified that error appears in the above-identified patent and that said Letters Patent is hereby corrected as shown below:

In the Claims

At Column 14, Line 49, after "communication endpoint that indicates that" delete the second occurrence of "that" therein.

Signed and Sealed this
Twenty-eighth Day of April, 2020

Andrei Iancu
*Director of the United States Patent and Trademark Office*